(12) United States Patent
Aitcin et al.

(10) Patent No.: US 8,012,050 B2
(45) Date of Patent: Sep. 6, 2011

(54) SNOWMOBILE WITH IMPROVED DRIVE TRAIN

(75) Inventors: Xavier-Pierre Aitcin, St-Hyacinthe (CA); Joel Pitre, Valcourt (CA); Yan Nolet, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 749 days.

(21) Appl. No.: 11/626,640

(22) Filed: Jan. 24, 2007

(65) Prior Publication Data

US 2008/0173492 A1 Jul. 24, 2008

(51) Int. Cl.
*F16H 55/56* (2006.01)

(52) U.S. Cl. .......... 474/8; 474/13; 474/28; 474/43; 474/46; 474/182; 475/204; 475/206; 475/210; 180/9.1; 180/9.64; 180/190

(58) Field of Classification Search .......... 474/13, 474/46, 903; 180/190, 182; 188/72.3; *B62B 13/00; B62D 55/07; B62M 27/02*
See application file for complete search history.

(56) References Cited

U.S. PATENT DOCUMENTS

| | | | | |
|---|---|---|---|---|
| 3,064,486 | A | * | 11/1962 | Aplin .......... 474/37 |
| 3,636,785 | A | * | 1/1972 | Weindler et al. .......... 474/43 |
| 3,985,192 | A | | 10/1976 | Samuelson et al. |
| 4,069,882 | A | | 1/1978 | Leonard et al. |
| 4,317,389 | A | * | 3/1982 | Falzoni .......... 475/204 |
| 4,362,524 | A | | 12/1982 | Lob et al. |
| 4,617,004 | A | * | 10/1986 | Mott .......... 474/8 |
| 5,607,026 | A | * | 3/1997 | Rioux et al. .......... 180/190 |
| 5,685,387 | A | | 11/1997 | Rioux et al. |
| 6,032,754 | A | * | 3/2000 | Izumi et al. .......... 180/190 |
| 6,860,826 | B1 | * | 3/2005 | Johnson .......... 474/19 |
| 2003/0008742 | A1 | * | 1/2003 | Kay .......... 474/182 |

* cited by examiner

*Primary Examiner* — Robert Siconolfi
*Assistant Examiner* — San Aung
(74) *Attorney, Agent, or Firm* — Osler, Hoskin & Harcourt LLP

(57) ABSTRACT

A snowmobile is disclosed having improved drive train including a continuously variable transmission (CVT) having a drive belt looped around a driving pulley and a driven pulley, and a transversely arranged jackshaft wherein the driven pulley is connected directly onto the outer surface of one end of the jackshaft. The transverse jackshaft is preferably made from a thin-walled hollow tube and the driven pulley is preferably press fitted thereon. A method of assembling a snowmobile drive train is also disclosed.

20 Claims, 6 Drawing Sheets

SNOWMOBILE WITH IMPROVED DRIVE TRAIN

FIELD OF THE INVENTION

The present invention relates generally to a snowmobile and in particular to a snowmobile drive train.

BACKGROUND OF THE INVENTION

Conventional snowmobile drive trains incorporate a variable ratio belt drive system (commonly referred to as Continuously Variable Transmission or CVT) having a driving pulley that is directly coupled to the engine crankshaft and a driven pulley coupled to an output shaft. The driving pulley acts as a clutch and includes a centrifugally actuated adjusting mechanism through which the drive ratio of the belt drive is varied progressively as a function of the engine speed and the output torque of the driven pulley. Typically, the driven pulley is coupled to a transverse jackshaft which in turn drives the input member of a chain and sprocket reduction drive. The output of reduction drive is coupled to one end of the axle on which are located the drive track drive sprocket wheels. Conventional jackshafts are typically solid steel shafts having splined ends onto which the driven pulley and the reduction drive are connected.

The splined ends or key way of the jackshaft are inserted into adapters that connect the jackshaft to the driven pulley and to the input member of the chain and sprocket reduction drive. A first adapter has an inner surface machined grooved to mesh with the first splined end of the jackshaft and an outer surface machined to engage the driven pulley. A second adapter has an inner surface similarly machined grooved to mesh with the second splined end of the jackshaft and an outer surface machined to engage the input member of the chain and sprocket reduction drive. FIG. 6 illustrates a prior art driven pulley mounted onto such a first adapter. As can be seen, the prior art driven pulley 200 is mounted onto an adapter shaft 202 which includes a series of internal splines designed to receive the splined ends of the conventional jackshaft. The prior art driven pulley 200 includes an axially stationary sheave 203, an axially moveable sheave 204 and a fixed outer portion 205. An internal biasing mechanism 206 is mounted between the fixed outer portion 205 and moveable sheave 204 to maintain the groove 207 at its minimum width. In operation, the moveable sheave 204 adjusts the width of the groove 207, and therefore the effective radius of the driven pulley 200, as a function of the torque applied to the driven pulley 200. The connection of the prior art pulley to a conventional jackshaft is therefore cumbersome and requires numerous parts, adding weight and cost to a snowmobile. The heretofore required use of an adapter to connect a conventional jackshaft to the driven pulley and to the reduction drive increases the number of parts included in the drive train as well as the number of steps required for the assembly thereof. This increases the production cost of the snowmobile as well as increases the number of part to maintain in inventory. Neither of which is desirable.

Furthermore, conventional jackshafts are made of solid steel shafts to resist the high torque generated between the snowmobile engine and the drive track. These solid shafts perform generally well for this application. Conventional solid jackshafts have been bored through in order to reduce their weight but the wall thickness remains very thick for the purpose of machining their splined ends. Thus they remain heavy. As is well known in the art of snowmobile design, the lighter the snowmobile, the better.

Thus, there is a need for a snowmobile jackshaft that alleviates some of the drawbacks of conventional jackshaft design.

STATEMENT OF THE INVENTION

One aspect of the present invention is to provide a snowmobile having a transversely arranged jackshaft and a driven pulley connected directly onto the outer surface of one end of the transversely arranged jackshaft.

Another aspect of the present invention is to provide a snowmobile having a transversely arranged thin-walled hollow jackshaft.

Another aspect of the present invention is to provide a snowmobile comprising: a frame having a forward end and a rearward end; a drive track assembly disposed below and supporting the rearward end of the frame; a front suspension connected to the forward end of the frame; two skis connected to the front suspension; an engine mounted on the frame and operatively connected to the drive track via a drive train for delivering propulsive power to the drive track, the engine having a width measured transversely across the snowmobile; the drive train including: a continuously variable transmission (CVT) having a drive belt looped around a driving pulley and a driven pulley; a transversely arranged jackshaft having an outer surface, a first end and a second end and extending at least the width of the engine; a reduction drive having an input member and an output member; the driven pulley being connected directly onto the outer surface of the first end of the jackshaft, the first end of the jackshaft being inserted into a central portion of the driven pulley and extending through the driven pulley; the second end of the jackshaft being connected to the input member of the reduction drive; and the drive track being operatively connected to the output member of the reduction drive.

In an additional aspect, the driven pulley is press fit directly onto the outer surface of the first end of the jackshaft.

In an additional aspect, the jackshaft includes a first outer diameter and a second outer diameter larger than the first outer diameter, the second outer diameter located at the first end of the jackshaft for receiving the driven pulley press fitted thereon.

In another aspect of the present invention, the outer surface of the first end of the jackshaft includes a stopper for positioning the driven pulley onto the outer surface of the jackshaft.

In a further aspect of the present invention, the transversely arranged jackshaft is a thin-walled hollow shaft, the thickness of the thin wall ranging from 0.080 inch to 0.300 inch.

In an additional aspect, the driven pulley is press fit onto the outer surface of the first end of the thin-walled hollow jackshaft.

In a further aspect of the present invention, the outer surface of the hollow jackshaft includes a first outer diameter and a second outer diameter larger than the first outer diameter, the second outer diameter located at the first end of the outer surface of the hollow jackshaft for receiving the driven pulley press fit thereon.

Another aspect of the present invention is to provide a jackshaft for a snowmobile comprising a thin-walled hollow shaft including an outer surface having at least one outer diameter and an inner surface having at least one inner diameter.

In an additional aspect, the outer surface of the a thin-walled hollow shaft includes a first outer diameter and a second outer diameter larger than the first outer diameter.

Another aspect of the present invention is to provide a method of assembling a snowmobile drive train including a continuously variable transmission (CVT) having a driving pulley and a driven pulley; the method comprising the steps of: mounting the driving pulley to an engine crankshaft; press fitting the driven pulley on an outer surface of a first end of a transversely arranged thin-walled hollow jackshaft; connecting a second end of the transversely arranged thin-walled hollow jackshaft to an input member of a reduction drive having an input member and an output member; operatively connecting a drive track to the output member of the reduction drive; and operatively connecting the driving pulley to the driven pulley via a drive belt looped around the driving pulley and the driven pulley.

Embodiments of the present invention each have at least one of the above-mentioned aspects, but not necessarily have all of them.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DESCRIPTION OF PREFERRED EMBODIMENT(S)

Figure 1:
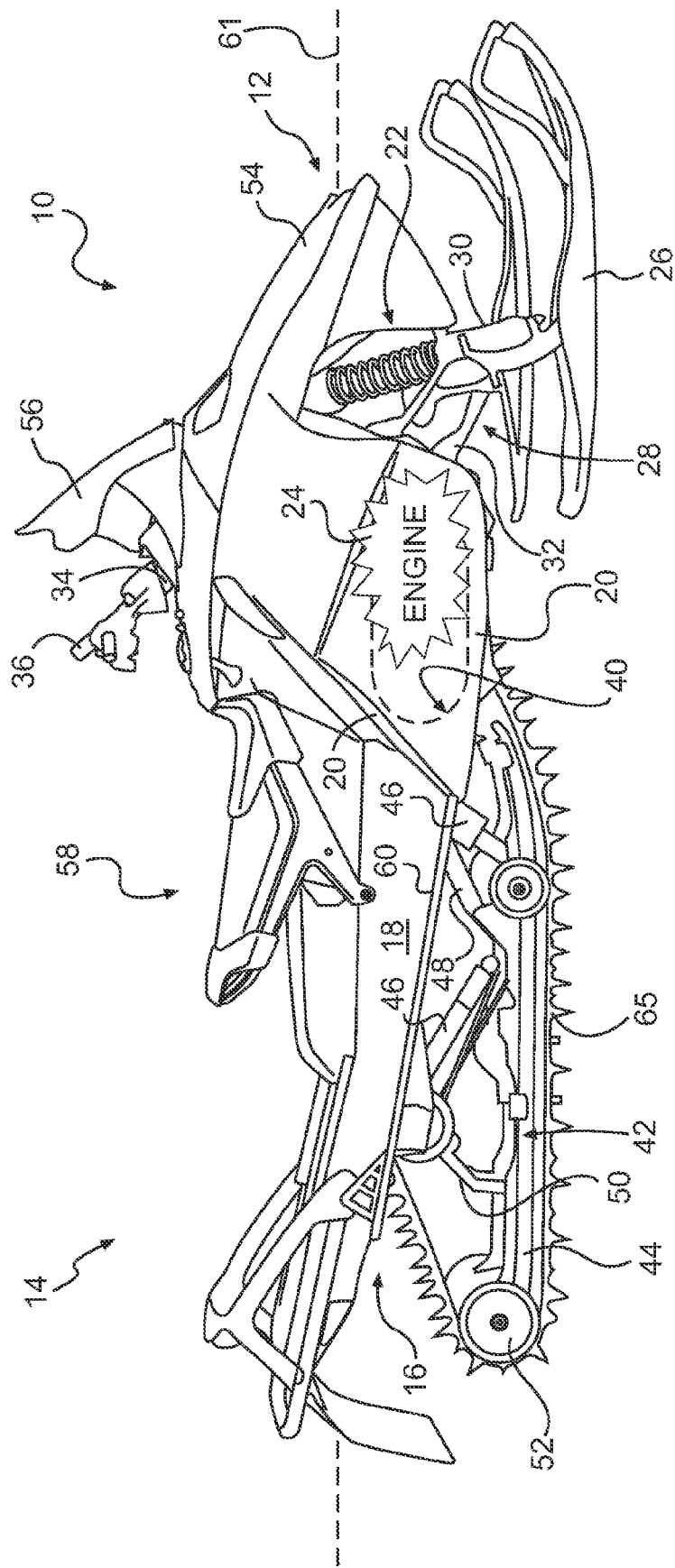
FIG. 1 is a side elevational view of a snowmobile incorporating a drive train in accordance with an embodiment of the invention.

Referring now to FIG. 1, a snowmobile incorporating an embodiment of the present invention is designated generally by reference numeral 10. Although certain aspects of the present invention are applicable in other types of vehicles, the present invention has particular utility in connection with snowmobiles.

The snowmobile 10 includes a forward end 12 and a rearward end 14 which are defined consistently with a travel direction of the vehicle. The snowmobile 10 includes a frame 16 which normally includes a tunnel 18, an engine cradle portion 20 and a front suspension assembly portion 22. Tunnel 18 generally consists of an inverted U-shaped bent sheet metal which extends rearwardly along the longitudinal axis of the snowmobile 10 and is connected at the front to the engine cradle portion 20. An engine 24, which is schematically illustrated in FIG. 1, is carried by the engine cradle portion 20 of the frame 16. A steering assembly (not indicated) is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively connecting the respective skis 26 to a steering column 34. A steering device such as a handlebar 36, positioned forward of a rider and behind the engine 24, is attached to the upper end of the steering column 34 to allow the rider to rotate the ski legs 30 and thus the skis 26, in order to steer the vehicle.

An endless drive track 65 is positioned at the rear end 14 of the snowmobile 10. The drive track 65 is disposed generally under the tunnel 18, and operatively connected to the engine 24 through a belt transmission system 40 illustrated schematically by broken lines and which will be described in greater detail below. The endless drive track 65 is driven to run about a rear suspension assembly 42 for propulsion of the snowmobile 10. The rear suspension assembly 42 includes a pair of slide rails 44 in sliding contact with the endless drive track 65. The rear suspension assembly 42 also includes one or more shock absorbers 46 which may further include a coil spring (not shown) surrounding the individual shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. In the particular snowmobile 10 shown in FIG. 1, the side panels can be opened along a vertical axis to swing away from the snowmobile 10. A windshield 56 may be connected to the fairings 54 near the front end 12 of the snowmobile 10 or directly to the handlebar 36. The windshield 56 acts as a wind screen to lessen the force of the air on the rider while the snowmobile 10 is moving.

The engine 24 is a type of internal combustion engine that is supported on the frame 16 and is located at the engine cradle portion 20. The internal construction of the engine 24 may be of any known type, however the engine 24 drives an output shaft (not shown) that rotates about a horizontally disposed axis that extends generally transversely to a longitudinal centerline 61 of the snowmobile 10. The engine output shaft drives the belt transmission system 40 for transmitting torque to the endless drive track 65 for propulsion of the snowmobile 10.

A straddle-type seat 58 is positioned atop the frame 16. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 2:
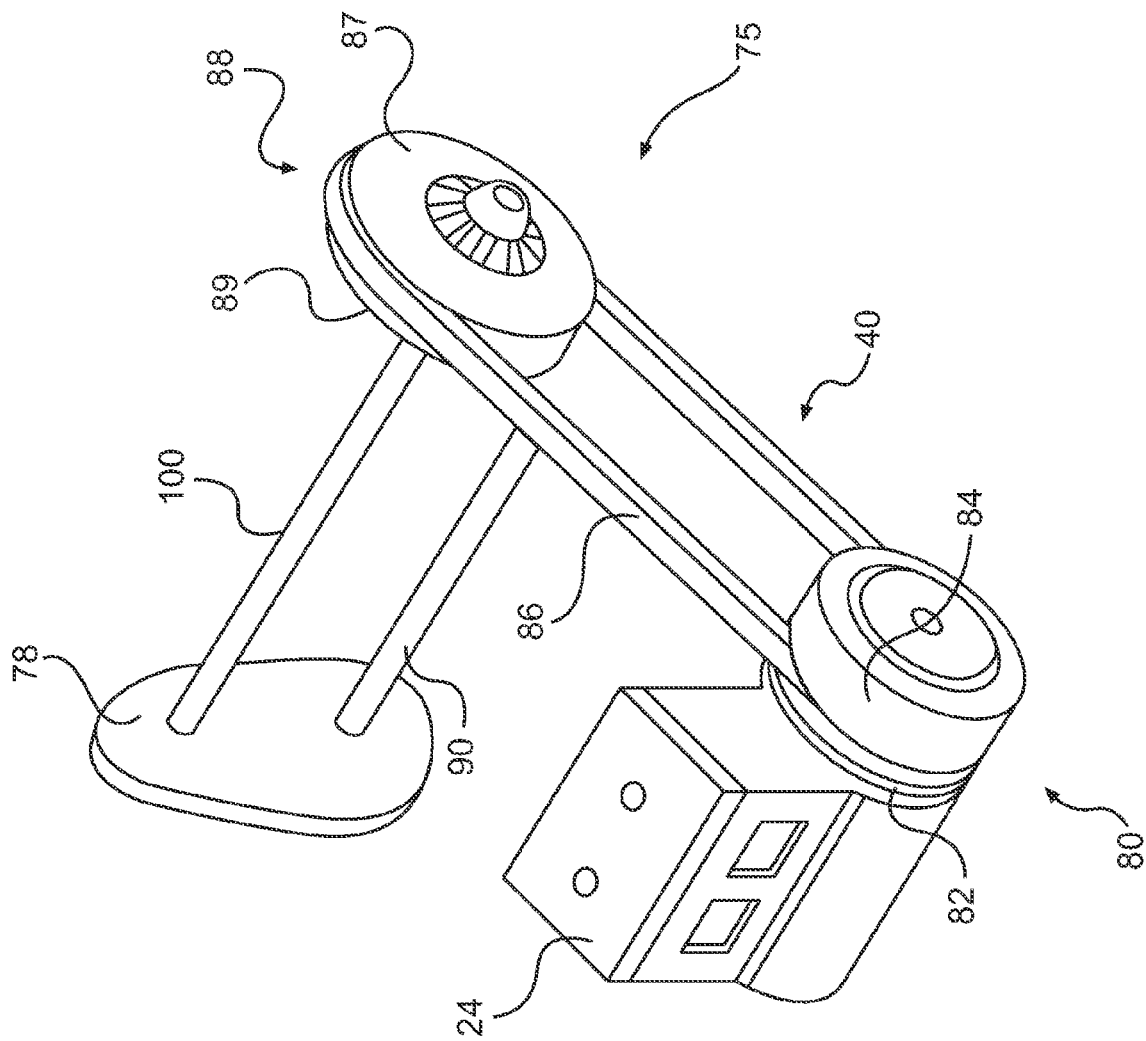
FIG. 2 is a schematic perspective side view of the drive train incorporated in the snowmobile of FIG. 1.

FIG. 2 illustrates schematically an engine 24 and a drive train 75 in accordance with one embodiment of the invention. The drive train 75 incorporates a variable ratio belt transmission system 40 commonly referred to as a CVT and a fixed ratio reduction drive 78. The variable ratio belt transmission system 40 includes a driving pulley 80 coupled to rotate with the crankshaft of the engine 24 and a driven pulley 88 coupled to one end of a transversely mounted jackshaft 100 which is supported on the frame 16 through bearings. As illustrated, the transversely mounted jackshaft 100 traverses the width of the engine 24. The opposite end of the transversely mounted jackshaft 100 is connected to the input member of the reduction drive 78 and the output member of the reduction drive 78 is connected to a drive axle 90 carrying sprocket wheels 92 (FIG. 3) that form a driving connection with the drive track 65.

The driving pulley 80 of the belt transmission system 40 is coupled to rotate with the crankshaft of the engine 24 and includes a pair of opposed frustoconical belt drive sheaves 82 and 84 between which the drive belt 86 is located. In a known manner, the sheaves 82 and 84 are biased apart, and the driving pulley 80 incorporates a centrifugally operated mechanism that acts to urge the moving sheave 84 towards the fixed sheave 82 with a force that increases with increasing crankshaft speed so that as the engine speed increases, the reduction ratio of the belt transmission system 40 decreases. The driven pulley 88 is coupled to rotate with the transversely mounted jackshaft 100 and includes a pair of frustoconical belt drive sheaves 87 and 89 between which the drive belt 86 is located. In a known manner, the driven pulley 88 reacts to the torque from the drive track 65 by separation of its sheaves which allows the drive belt 86 to engage the driven pulley 88 at a diameter that is progressively reduced as the torque increases or that is progressively increased as the torque decreases. When the driving pulley 80 increases its diameter, the driven pulley 88 decreases its effective diameter and vice versa, thus keeping the drive belt 86 tight.

In this particular example, the driving pulley 80 rotates at the same speed as the crankshaft of the engine 24 whereas the speed of rotation of the transverse jackshaft 100 is determined in accordance with the instantaneous ratio of the belt drive system 40, and the drive axle 90 will rotate at a lower speed than the transverse jackshaft 100 because of the action of the reduction drive 78. Typically, the input member of the reduction drive 78 consists of a small sprocket connected to the transverse jackshaft 100 and coupled to drive an output member consisting of larger sprocket connected to the drive axle 90 through a driving chain, all enclosed within the housing of the reduction drive 78.

Figure 3:
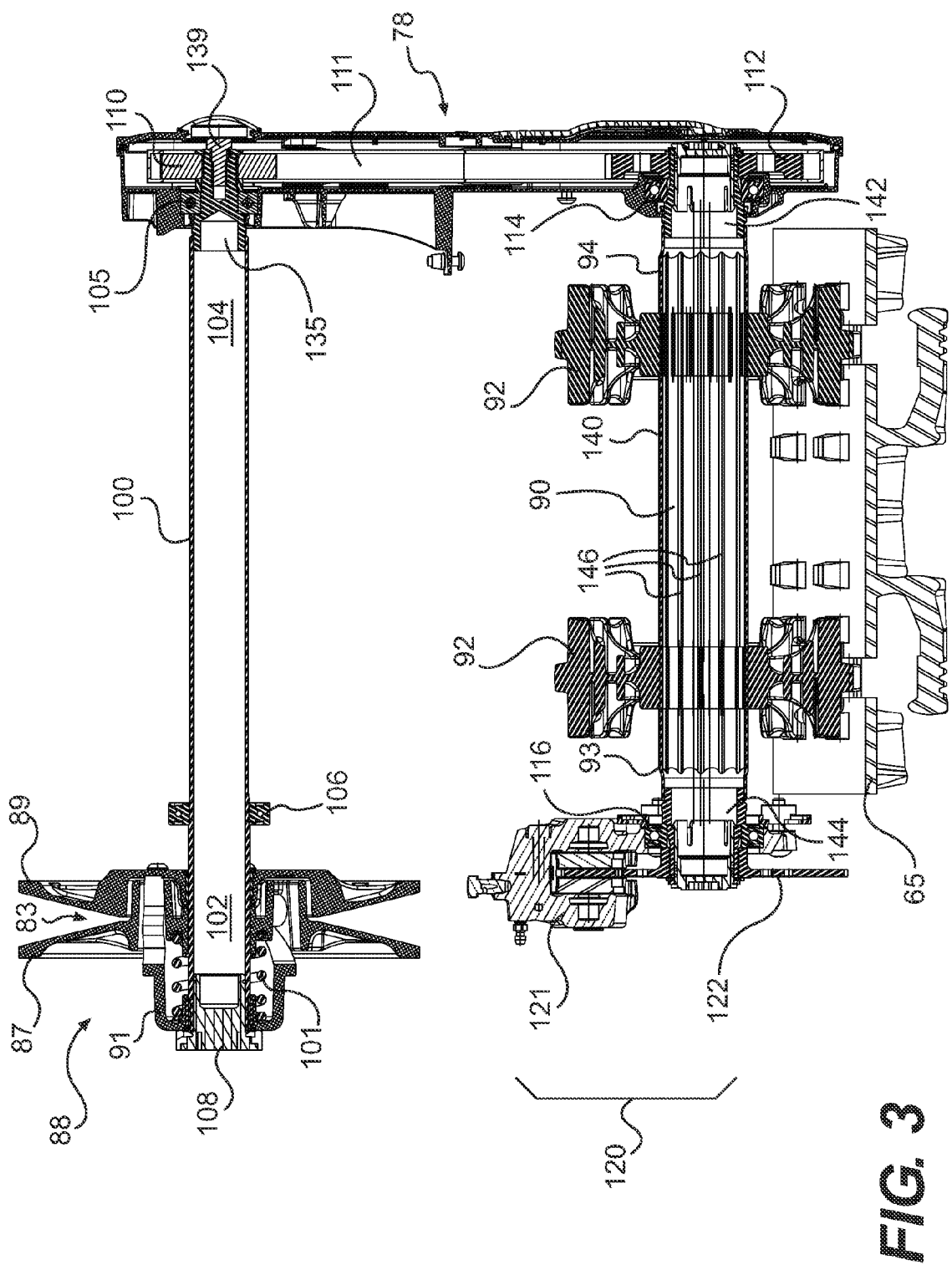
FIG. 3 is a partial cut-away view of the drive train of the snowmobile shown in FIG. 1 in accordance with an embodiment of the invention.

FIG. 3 is a cut-away view showing the construction and assembly of the transverse jackshaft 100 to the driven pulley 88 and to the reduction drive 78. The driven pulley 88 is connected directly onto the outer surface of the first end 102 of the transverse jackshaft 100 and the small sprocket 110 of the reduction drive 78 is connected to the second end 104 of the transverse jackshaft 100 via an adapter 135. The transverse jackshaft 100 is supported by a pair of bearings 105 and 106 mounted to the frame 16 (FIG. 1). The small sprocket 110 transfers the rotational speed of the transverse jackshaft 100 to the larger sprocket 112 through the chain 111 linking the small sprocket 110 to the larger sprocket 112 thereby effecting the reduction of rotational speed. The larger sprocket 112 is connected to a first end 94 of the drive axle 90 which is supported by a pair of bearings 114 and 116 mounted to the tunnel portion of the frame 16 (FIG. 1). The drive axle 90 includes a pair of sprocket wheels 92 forming a driving connection between the drive axle and the drive track 65. A braking system 120 for the snowmobile is connected to the second end 93 of the drive axle 90 and includes a brake disc 122 fixed to rotate with the drive axle 90 and a brake caliper 121 fixedly connected to the frame 16.

In this specific embodiment, the reduction drive 78 consists of a chain and sprocket assembly however other reduction mechanisms may be used to effect rotational speed reduction. For example, a gear assembly having a reduction ratio between its input member and its output member can be used as is well known in the art.

As illustrated in FIG. 3, the driven pulley 88 is mounted directly onto the outer surface of the first end 102 of the transverse jackshaft 100. More specifically, the fixed sheave 87 of the driven pulley 88 is press fitted directly onto the outer surface of the transverse jackshaft 100 whereas the moveable sheave 89 is slidably mounted thereto such that it may move along the length of the jackshaft 100. Press fitting the fixed sheave 87 of the driven pulley 88 directly onto the outer surface of the transverse jackshaft 100 eliminates adapters typically required in prior art assemblies of driven pulleys onto jackshafts. The transverse jackshaft 100 extends completely through the driven pulley 88 in order to guide and support the outer portion 91 of the moveable sheave 89 and its spring biased mechanism 101. A machined stopper 108 is inserted into the first end 102 to provide a seal for the inner portion of the transverse jackshaft 100.

Figure 4:
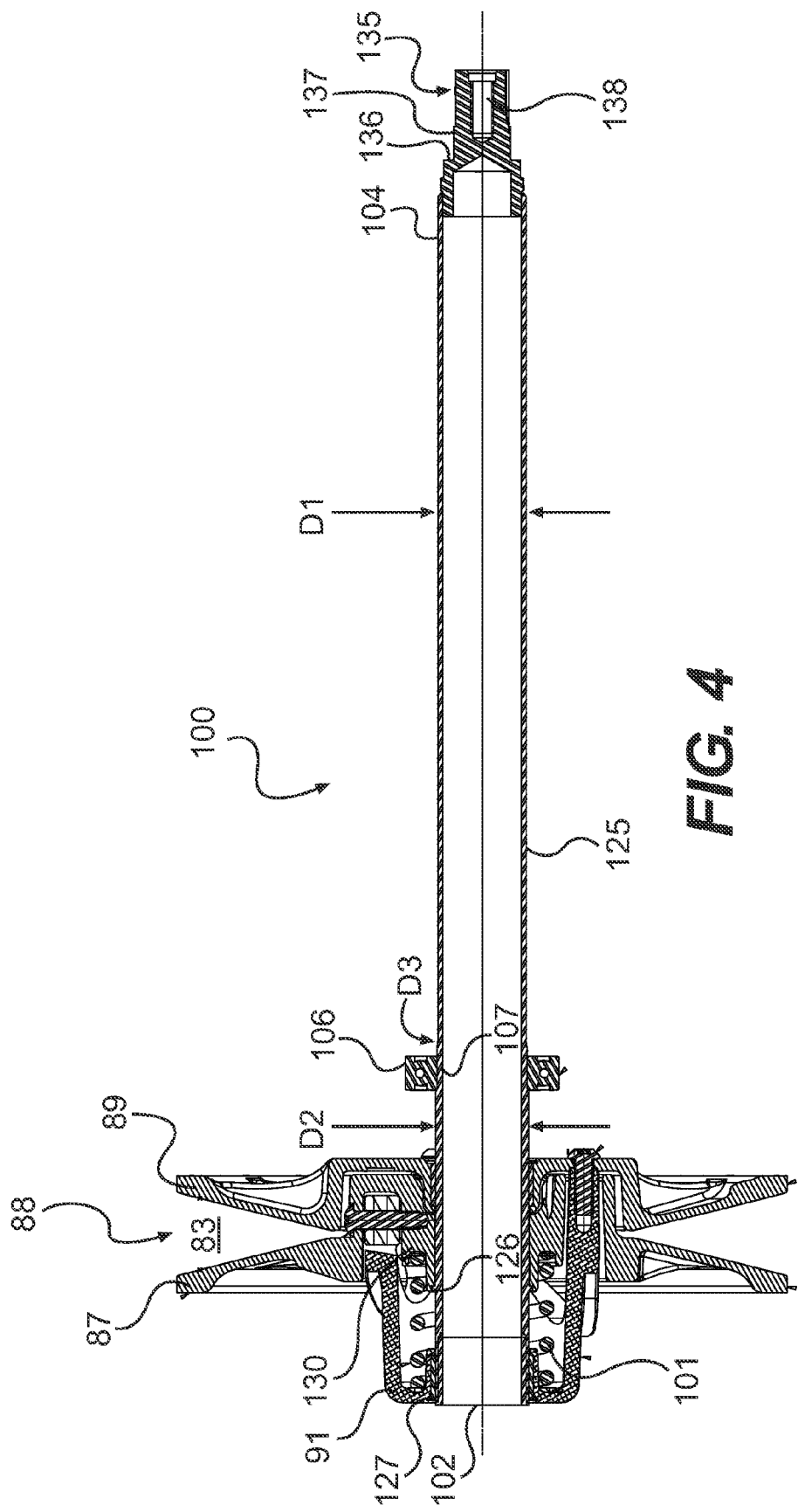
FIG. 4 is a cross-sectional view of the assembly of the jackshaft and the driven pulley in accordance with an embodiment of the invention.
Figure 5:
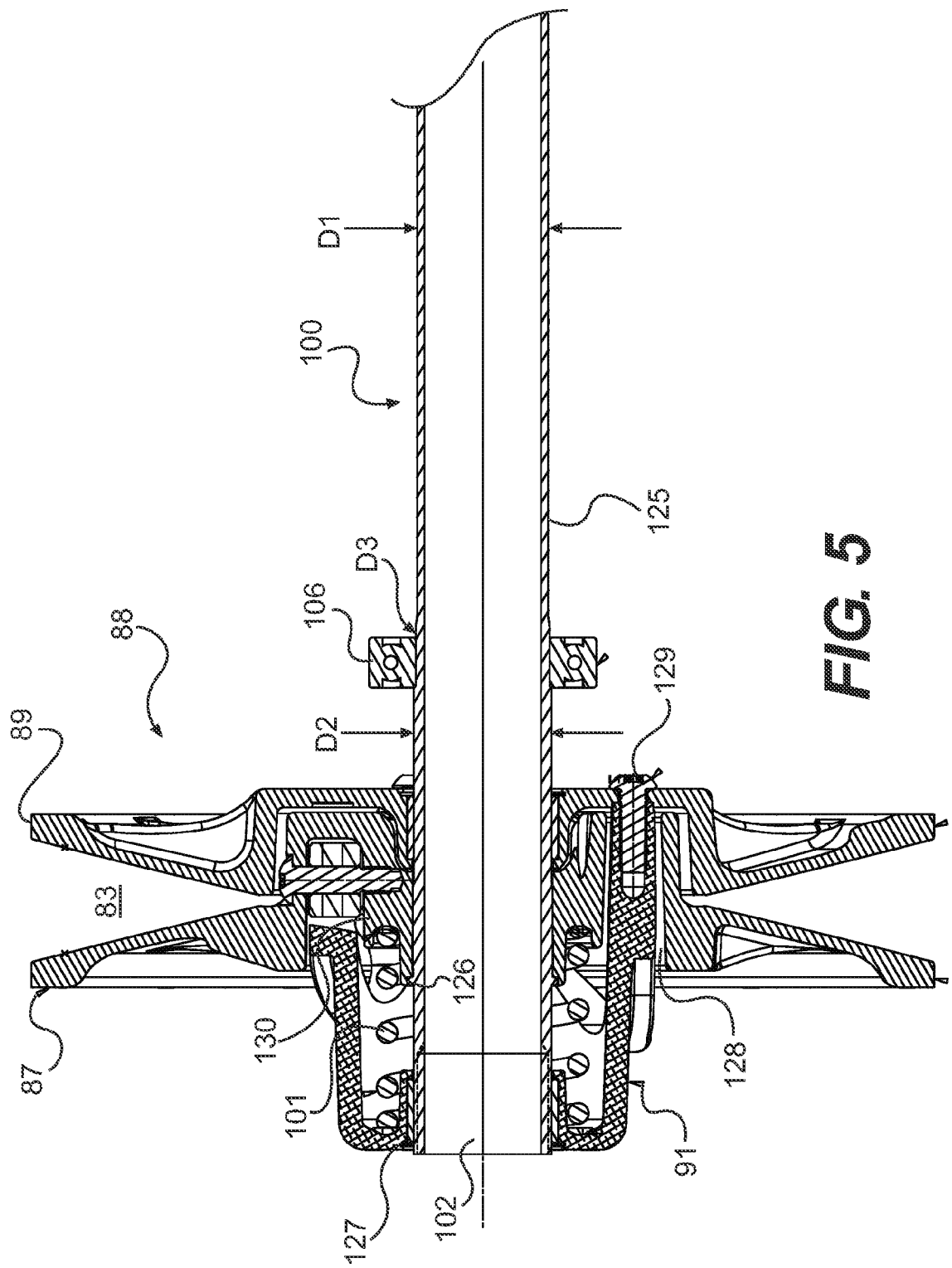
FIG. 5 is a enlarged view of the jackshaft and the driven pulley shown in FIG. 4.
Figure 6:
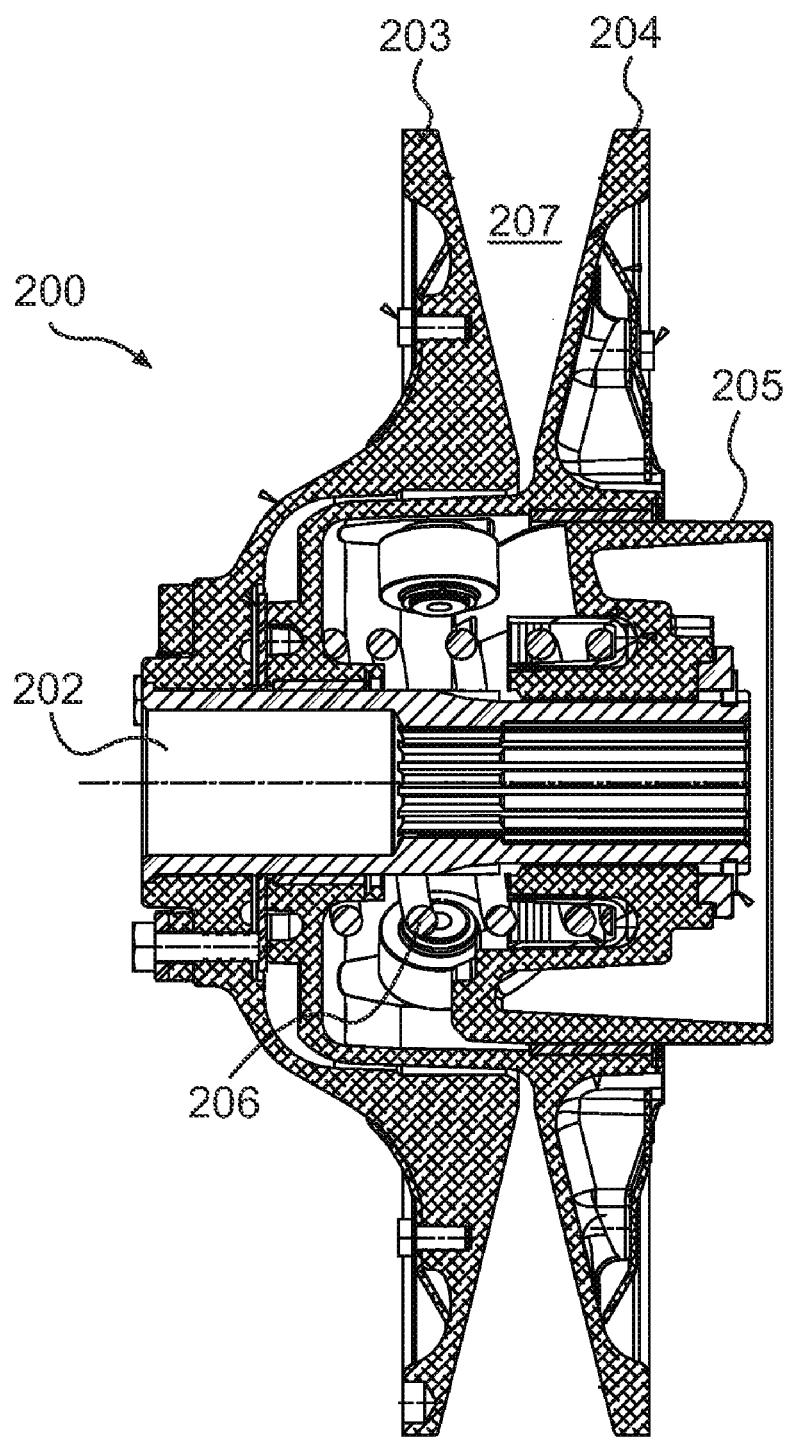
FIG. 6 is a cross-sectional view of a prior art driven pulley mounted onto an adapter shaft.

With reference to FIGS. 4 and 5, the moveable sheave 89 and the fixed sheave 87 define the groove 83 of the driven pulley 88. The moveable sheave 89 is adapted to move along the axis of the transverse jackshaft 100 and is biased towards the fixed sheave 87 by the spring 101 applying a predetermined force onto the outer portion 91 of the moveable sheave 89, thereby defining the effective diameter of engagement of the drive belt 86 going around the driven pulley 88. When the two sheaves 87, 89 of the pulley 88 are close together, the drive belt 86 rides higher in the groove 83 defining a larger effective diameter of engagement. When the two sheaves 87, 89 of the pulley 88 are far apart, the drive belt 86 rides lower in the groove 83 defining a smaller effective diameter of engagement.

In operation, as the torque increases, the drive belt 86 applies increased pressure onto the driven pulley 88 which eventually overcomes the biasing force of the spring 101 thereby axially displacing the moveable sheave 89 and its outer portion 91 along the axis of the jackshaft 100, away from the fixed sheave 87, thereby opening the groove 83, and reducing the effective diameter of the driven pulley 88.

The transverse jackshaft 100 is constructed from a thin walled hollow tube 125 having an outer surface and an inner surface. The thin walled hollow tube 125 is preferably made of hardened steel or alloyed steel however any metal or alloy thereof capable of withstanding the torques to which the transverse jackshaft 100 is subjected, can be used. The thin wall thickness is preferably ranging from 0.080 inch to 0.300 inch. The use of a thin walled hollow tube 125 to form the main part of the transverse jackshaft 100 provides a substantial weight saving as compared to the solid steel jackshafts used in prior art snowmobile drive trains, yet it provides sufficient strength to resist the high torques transferred therethrough.

The outer surface of the thin walled hollow tube 125 is machined such that its outer diameter includes a small diameter $D_1$ extending from the second end 104 of the transverse jackshaft 100 to the location of the support bearing 106, and a larger diameter $D_2$ extending from the support bearing 106 location to the first end 102 of the hollow transverse jackshaft 100. The transition from the smaller diameter $D_1$ to the larger diameter $D_2$ is used to shoulder and position the support bearing 106. In the illustrated embodiment, an intermediate stepped surface 107 having an intermediate diameter $D_3$ is provided to accommodate the support bearing 106. The inner surface of the thin walled hollow tube 125 includes at least one inner diameter. The ends 104 and 102 of the inner surface of the thin walled hollow tube 125 may be machined to a specific diameter to accommodate the adapter 135 and the stopper 108, respectively.

As previously mentioned, the fixed sheave 87 is press fitted onto the outer surface of the first end 102 of the hollow transverse jackshaft 100. The inner portion 130 of the fixed sheave 87 has an inner diameter equal to or slightly smaller than the larger diameter $D_2$ and is press fitted onto the segment of the thin walled hollow transverse jackshaft 100 where the outer diameter is the larger diameter $D_2$. The outer surface of the first end 102 of the hollow transverse jackshaft 100 includes a protruding ridge 126 acting as a stopper onto which the inner portion 130 of the fixed sheave 87 abuts thereby positioning the driven pulley 88 during assembly and locking the driven pulley 88 in that position. The outer surface of the first end 102 of the thin walled jackshaft 100 may be knurled at the area where the fixed sheave 87 is press fitted to increase the friction force between the fixed sheave 87 and the thin walled jackshaft 100. The fixed sheave 87 and moveable sheave 89 are assembled onto the thin walled transverse jackshaft 100 by inserting them through the second end 104 and sliding them along the thin walled hollow tube 125 towards the first end 102 until the inner portion 130 of the fixed sheave 87 abuts against the protruding ridge 126. Thereafter, the outer portion 91 of the moveable sheave 89 is inserted onto the first end 102 and passed through the apertures 128 (only one shown) of the fixed sheave 87 and is fixedly connected to the moveable sheave 89 via fasteners 129 (only one shown) such that the outer portion 91 moves with the moveable sheave 89 and the spring 101 biases the moveable sheave 89 towards the fixed sheave 87.

As can be seen in FIGS. 4 and 5, when the driven pulley 88 is assembled onto the thin walled hollow tube 125, the first end 102 of the hollow jackshaft 100 extends through the driven pulley 88 and protrude marginally past the outer portion 91 of the moveable sheave 89. The protruding first end 102 of the hollow jackshaft 100 serves to maintain the outer portion 91 of the moveable sheave 89 aligned with the hollow jackshaft 100 when the moveable sheave 89 is displaced towards the second end 104 of the hollow jackshaft 100 under the force of the drive belt 86 (FIG. 2).

At the second end 104 of the hollow jackshaft 100, an adapter 135 is inserted into the hollow portion of the jackshaft 100 and press fitted and/or welded therein. The adapter 135 may also be mounted onto the outside of the hollow jackshaft 100 and press fitted and/or welded thereon. The adapter 135 is used to connected the hollow jackshaft 100 to the small sprocket 110 of the reduction drive 78 best illustrated in FIG. 3. The adapter 135 includes a shoulder 136 defining a step onto which is positioned the inner portion of the support bearing 105, the outer portion of the support bearing 105 being mounted to the frame 16 as previously described and as shown in FIG. 3. The adapter 135 also comprises a sunken threaded hole 138 adapted to receive a bolt 139 as illustrated in FIG. 3. The adapter 135 therefore provides the necessary means to securely connect the small sprocket 110 to the hollow jackshaft 100 and to support the small sprocket 110 and the hollow jackshaft 100 through the support bearing 105.

Referring back to FIG. 3, the drive axle 90 is constructed from a hollow shaft 140 and a pair of adapters 142 and 144 solidly inserted at each end of the shaft 140. The adapter 142 is designed to connected the shaft 140 to the large sprocket 112 of the reduction drive 78 and is provided with a shoulder defining a step onto which is positioned the inner portion of the support bearing 114, the outer portion of the support bearing 114 being mounted to the frame 16. The adapter 144 is designed to connected the shaft 140 to the brake disk 122 and is also provided with a shoulder defining a step onto which is positioned the inner portion of the support bearing 116, the outer portion of the support bearing 116 being mounted to the frame 16. The shaft 140 consists of an hydroformed metal shaft having a series of ridges 146 extending along the length of the shaft 140 which provide added torsional rigidity to the shaft 140 relative to a straight shaft. The weight of the drive axle 90 may therefore be reduced by the use of a ridged shaft 140 for a given torsional rigidity requirement.

The ridges 146 of the shaft 140 also provide solid anchoring means for the sprocket wheels 92 attached thereto which are typically made of molded material. The sprocket wheels 92 are preferably molded directly onto the ridged shaft 140.

In another embodiment, the transverse jackshaft 100 may be also constructed from a hollow extruded metal shaft having a series of ridges providing added torsional rigidity to the jackshaft 100. In this particular embodiment, the central portion of the transverse jackshaft 100 and the second end 104 are provided with longitudinal ridges similar to the drive axle 90 however the first end 102 remains unridged to enable press fitting of the driven pulley directly onto the outer surface of the transverse jackshaft 100 and machining of an intermediate stepped surface 107 to accommodate the support bearing 106.

The assembly of the driven pulley 88 directly onto the outer surface of the transverse jackshaft 100 eliminates the standard adapter used in prior art assembly thereby reducing the weight and cost of the snowmobile drive train. As well, the additional step of assembling the driven pulley to the adapter and the adapter to the jackshaft is eliminated further reducing production cost of a snowmobile incorporating the transverse jackshaft 100. The direct assembly of the driven pulley 88 onto the outer surface of the transverse jackshaft 100 also enables the use of a hollow transverse jackshaft 100 constructed from a thin walled hollow tube 125 or a thin walled hollow ridged shaft which further decrease the weight of the drive train 75 and therefore of the snowmobile 10.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What we claim is:
1. A snowmobile comprising:
   a frame having a forward end and a rearward end;
   a drive track assembly disposed below and supporting the rearward end of the frame;
   a front suspension connected to the forward end of the frame;
   two skis connected to the front suspension; and
   an engine mounted on the frame and operatively connected to the drive track via a drive train for delivering propulsive power to the drive track, the engine having a width measured transversely across the snowmobile;
   the drive train including:
      a continuously variable transmission (CVT) having a drive belt looped around a driving pulley and a driven pulley;
      a transversely arranged jackshaft having an outer surface, a first end and a second end and extending at least the width of the engine; and
      a reduction drive having an input member and an output member;

the driven pulley being connected directly onto the outer surface of the first end of the jackshaft, the first end of the jackshaft being inserted into a central portion of the driven pulley and extending through the driven pulley, the driven pulley having a fixed sheave and a moveable sheave, the fixed sheave having a connecting surface fixedly connected to the outer surface of the first end of the jackshaft, the movable sheave having a first sliding surface slideably connected to the outer surface of the first end of the jackshaft, the movable sheave having a removable outer portion, the fixed sheave being disposed along the jackshaft between at least a portion of the outer portion and the movable sheave, the driven pulley having a biasing spring abutting the outer portion and the fixed sheave, the biasing spring biasing the moveable sheave toward the fixed sheave, the outer portion having a second sliding surface slideably connected to the outer surface of the first end of the jackshaft, the connecting surface being disposed along the jackshaft between the first sliding surface and the second sliding surface, the second end of the jackshaft being connected to the input member of the reduction drive, and the drive track being operatively connected to the output member of the reduction drive.

2. A snowmobile as defined in claim 1 wherein the driven pulley is non-rotatably connected to the first end of the jackshaft.

3. A snowmobile as defined in claim 1 wherein the jackshaft includes an adapter connected to the second end of the jackshaft, the input member of the reduction drive being connected to the adapter.

4. A snowmobile as defined in claim 3, wherein the jackshaft is a thin walled tube having a thickness of 0.300 inch or less, the thin walled tube including an inner surface having at least one inner diameter.

5. A snowmobile as defined in claim 3, wherein the adapter is mounted onto the outer surface of the second end of the jackshaft.

6. A snowmobile as defined in claim 4 wherein the adapter is inserted into the inner surface of the second end of the jackshaft.

7. A snowmobile as defined in claim 1 wherein at least a portion of the outer surface of the jackshaft is knurled.

8. A snowmobile as defined in claim 1 wherein the transversely arranged jackshaft is a thin-walled hollow shaft, the thickness of the thin wall ranging from 0.080 inch to 0.300 inch.

9. A snowmobile as defined in claim 8 wherein the fixed sheave is press fit onto the outer surface of the first end of the thin-walled hollow jackshaft.

10. A snowmobile as defined in claim 9 wherein the outer surface of the thin-walled hollow shaft includes a first outer diameter and a second outer diameter larger than the first outer diameter, the second outer diameter being located at the first end of the outer surface of the thin-walled hollow shaft for receiving the fixed sheave press fit thereonto.

11. A snowmobile as defined in claim 10 wherein the second outer diameter of the outer surface of the thin-walled hollow shaft includes a stopper for positioning the fixed sheave onto the outer surface of the first end of the thin-walled hollow jackshaft.

12. A snowmobile as defined in claim 9 wherein at least a portion of the outer diameter of the thin-walled hollow shaft is knurled.

13. A snowmobile as defined in claim 8 wherein the thin-walled hollow shaft includes an inner surface, an adapter being inserted into the inner surface at the second end of the thin-walled hollow shaft, the adapter connecting the input member of the reduction drive to the second end of the thin-walled hollow shaft.

14. A snowmobile as defined in claim 1 wherein the jackshaft is a thin-walled hollow shaft including an outer surface having at least one outer diameter and an inner surface having at least one inner diameter.

15. A snowmobile as defined in claim 1 wherein the connecting surface is disposed along the jackshaft between the biasing spring and the first sliding surface.

16. A method of assembling a snowmobile drive train including a continuously variable transmission (CVT) having a driving pulley and a driven pulley, the driven pulley having a fixed sheave, a moveable sheave, and a biasing spring, the movable sheave including a removable outer portion; the method comprising the steps of:

mounting the driving pulley to an engine crankshaft;

inserting the movable sheave onto a first end of a transversally arranged thin-walled hollow jackshaft, the movable sheave having a first sliding surface slideably connected to an outer surface of the first end of the transversely arranged thin-walled hollow jackshaft;

press fitting a connecting surface of the fixed sheave onto the outer surface of the first end of the transversely arranged thin-walled hollow jackshaft, the outer surface of the first end of the jackshaft having a constant diameter;

inserting the outer portion of the moveable sheave and the biasing spring onto the first end of the transversally arranged thin-walled hollow jackshaft, the fixed sheave being disposed along the transversely arranged thin-walled hollow jackshaft between at least a portion of the outer portion and the movable sheave, the biasing spring abutting the outer portion and the fixed sheave;

connecting the outer portion to the moveable sheave, the biasing spring biasing the moveable sheave toward the fixed sheave, the outer portion having a second sliding surface slideably connected to the outer surface of the first end of the transversely arranged thin-walled hollow jackshaft, the connecting surface being disposed along the transversely arranged thin-walled hollow jackshaft between the first sliding surface and the second sliding surface;

connecting a second end of the transversely arranged thin-walled hollow jackshaft to an input member of a reduction drive having an input member and an output member;

operatively connecting a drive track to the output member of the reduction drive; and operatively connecting the driving pulley to the driven pulley via a drive belt looped around the driving pulley and the driven pulley.

17. A method of assembling a snowmobile drive train as defined in claim 16, further comprising the step of inserting a stopper at the first end of the thin-walled hollow jackshaft for positioning the driven pulley onto the outer surface of the first end of the thin-walled hollow jackshaft.

18. A snowmobile comprising:

a frame having a forward end and a rearward end;

a drive track assembly disposed below and supporting the rearward end of the frame;

a front suspension connected to the forward end of the frame;

two skis connected to the front suspension; and an engine mounted on the frame and operatively connected to the drive track via a drive train for delivering propulsive power to the drive track, the engine having a width measured transversely across the snowmobile;

the drive train including:
- a continuously variable transmission (CVT) having a drive belt looped around a driving pulley and a driven pulley;
- a transversely arranged jackshaft having an outer surface, a first end and a second end and extending at least the width of the engine; and
- a reduction drive having an input member and an output member;

the driven pulley being press-fit onto the outer surface of the first end of the jackshaft, the first end of the jackshaft being inserted into a central portion of the driven pulley and extending through the driven pulley, the driven pulley having a fixed sheave and a moveable sheave, the fixed sheave having a connecting surface press-fitted to the outer surface of the first end of the jackshaft, the movable sheave having a first sliding surface slideably connected to the outer surface of the first end of the jackshaft, the movable sheave having a removable outer portion, the fixed sheave being disposed along the jackshaft between at least a portion of the outer portion and the movable sheave, the driven pulley having a biasing spring abutting the outer portion and the fixed sheave, the biasing spring biasing the moveable sheave toward the fixed sheave, the outer portion having a second sliding surface slideably connected to the outer surface of the first end of the transversely arranged thin-walled hollow jackshaft, the connecting surface being disposed along the transversely arranged thin-walled hollow jackshaft between the first sliding surface and the second sliding surface, the second end of the jackshaft being connected to the input member of the reduction drive, and the drive track being operatively connected to the output member of the reduction drive.

19. A snowmobile as defined in claim 18 wherein the outer surface of the jackshaft has a first outer diameter and a second outer diameter larger than the first outer diameter, the second outer diameter being located at the first end of the jackshaft for receiving the driven pulley press fit thereonto.

20. A snowmobile as defined in claim 19 wherein the outer surface of the first end of the jackshaft includes a stopper for positioning the driven pulley onto the outer surface of the first end of the jackshaft.

* * * * *